US011680691B2

(12) United States Patent
Palmenberg et al.

(10) Patent No.: US 11,680,691 B2
(45) Date of Patent: Jun. 20, 2023

(54) HYBRID POWER SYSTEM FOR LIGHTING AND OTHER USES

(71) Applicant: EWX FIELD SERVICES, LLC, Houston, TX (US)

(72) Inventors: Jason Palmenberg, The Woodlands, TX (US); Stephen Barth, Houston, TX (US); Michael Demasie, Houston, TX (US); Martin Janda, Houston, TX (US); Luke Sonnefeld, Houston, TX (US)

(73) Assignee: EWX FIELD SERVICES, LLC, Houston, TX (US)

( * ) Notice: Subject to any disclaimer, the term of this patent is extended or adjusted under 35 U.S.C. 154(b) by 0 days.

(21) Appl. No.: 17/495,659

(22) Filed: Oct. 6, 2021

(65) Prior Publication Data

US 2022/0107064 A1 Apr. 7, 2022

Related U.S. Application Data

(60) Provisional application No. 63/088,796, filed on Oct. 7, 2020.

(51) Int. Cl.
*F21S 9/03* (2006.01)
*F21V 21/22* (2006.01)
*F21V 23/00* (2015.01)
*F21S 9/02* (2006.01)

(52) U.S. Cl.
CPC ............. *F21S 9/032* (2013.01); *F21S 9/026* (2013.01); *F21V 21/22* (2013.01); *F21V 23/001* (2013.01)

(58) Field of Classification Search
CPC .......... F21S 9/026; F21S 9/032; F21V 21/22; F21V 23/001; F21L 13/00; F21W 2131/10; F21W 2131/402; Y02B 10/10; Y02B 10/70; Y02B 20/72
See application file for complete search history.

(56) References Cited

U.S. PATENT DOCUMENTS

| 10,393,324 | B1* | 8/2019 | Chambers | E04H 12/182 |
| 2010/0232148 | A1* | 9/2010 | Sharpley | F21L 4/08 |
| | | | | 362/183 |
| 2012/0201015 | A1* | 8/2012 | Robertson | F21L 14/04 |
| | | | | 362/183 |

(Continued)

FOREIGN PATENT DOCUMENTS

| AU | WO 2016/197192 | * | 6/2016 | ............... F21S 8/08 |
| CA | WO 2014056086 | * | 4/2014 | ............ H05B 45/00 |
| CA | WO 2017031586 | * | 3/2017 | ............. F21V 21/22 |

Primary Examiner — Zheng Song
(74) Attorney, Agent, or Firm — Jeffrey Streets; Madan Law PLLC

(57) ABSTRACT

A system includes a control unit, a solar unit and a light unit. The control unit includes a main distribution box, a combustion engine electrical generator coupled to the main distribution box, and a first plurality of photovoltaic panels coupled to the main distribution box. The solar unit includes a second plurality of photovoltaic panels coupled to the main distribution box using a cable, and a first rechargeable battery unit coupled to a first battery inverter that is further coupled to the main distribution box. The light unit includes an array of area lights, a third plurality of photovoltaic panels, and a second rechargeable battery unit coupled to a second battery inverter.

22 Claims, 12 Drawing Sheets

(56) References Cited

U.S. PATENT DOCUMENTS

| | | | |
|---|---|---|---|
| 2012/0201016 A1* | 8/2012 | Robertson | B62D 63/08 |
| | | | 362/183 |
| 2013/0250561 A1* | 9/2013 | Knodel | F21S 9/03 |
| | | | 362/184 |
| 2016/0281938 A1* | 9/2016 | Carpoff | F21L 14/04 |
| 2017/0047770 A1* | 2/2017 | Imperial | H02S 40/38 |
| 2017/0141721 A1* | 5/2017 | Schmidt | F21S 9/032 |
| 2018/0283662 A1* | 10/2018 | Kennedy | F21L 14/04 |
| 2018/0287549 A1* | 10/2018 | Long | F21S 9/035 |
| 2018/0320835 A1* | 11/2018 | Poage | F21S 9/032 |
| 2020/0248471 A1* | 8/2020 | Chambers | F21L 14/04 |

* cited by examiner

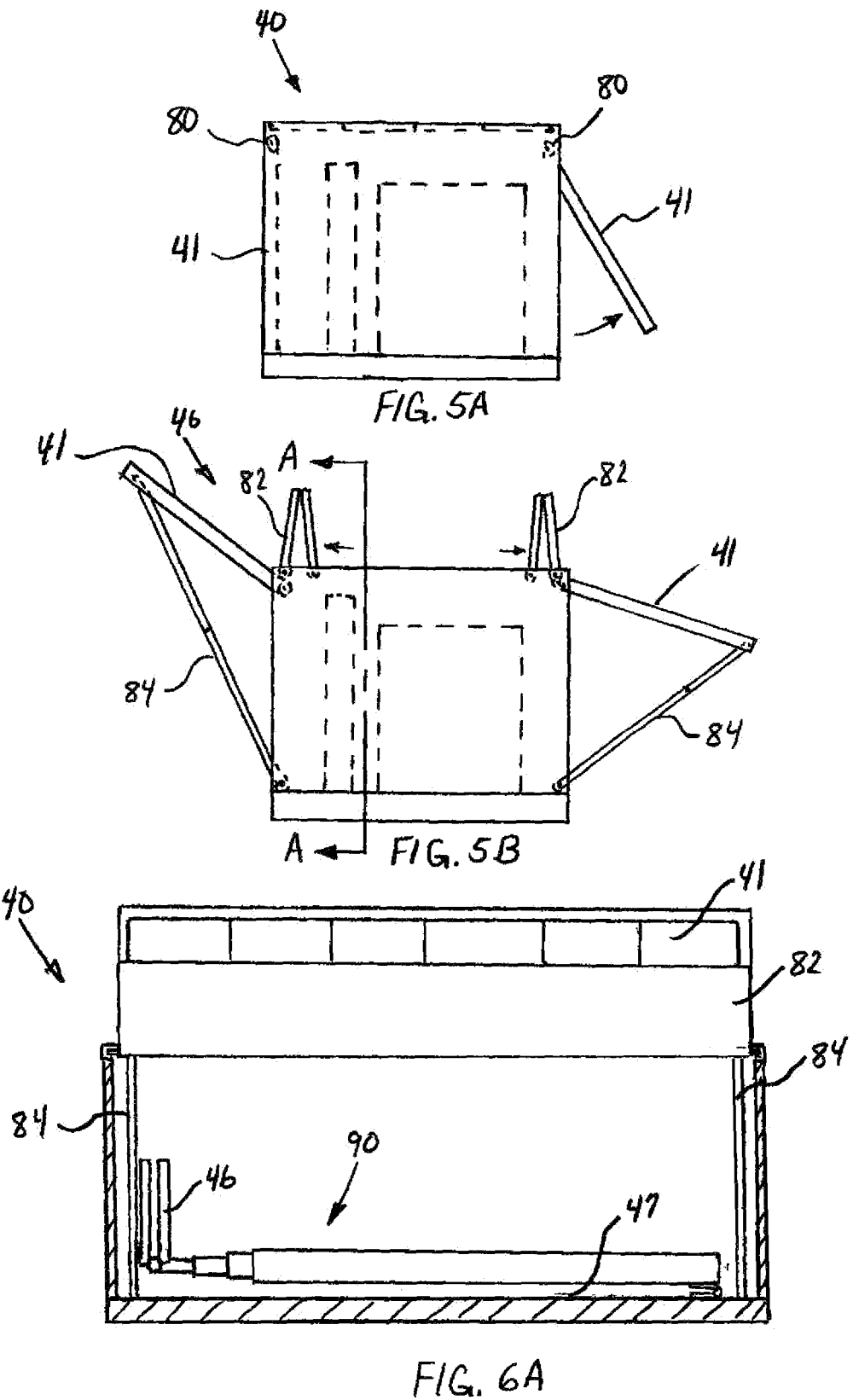

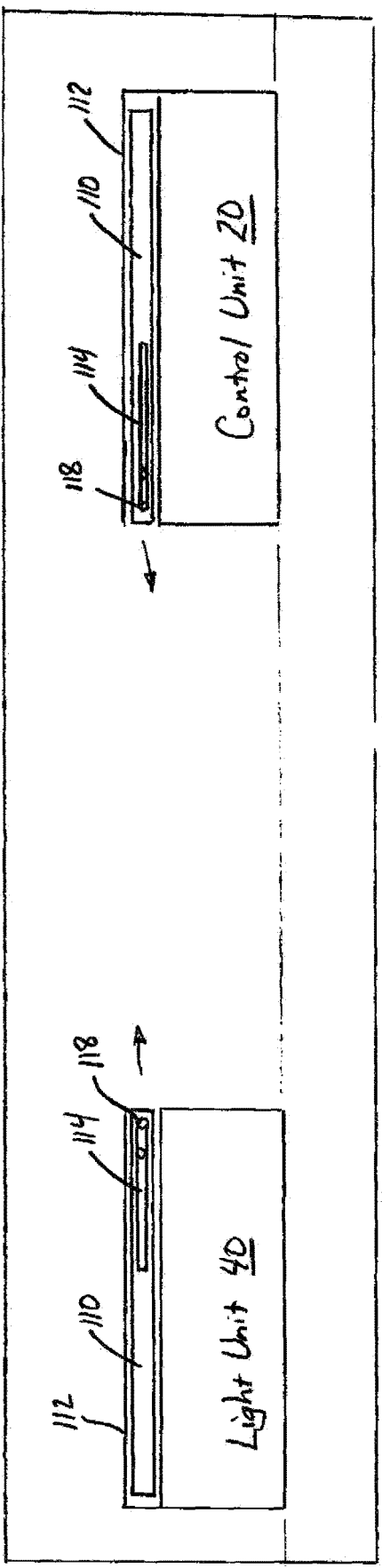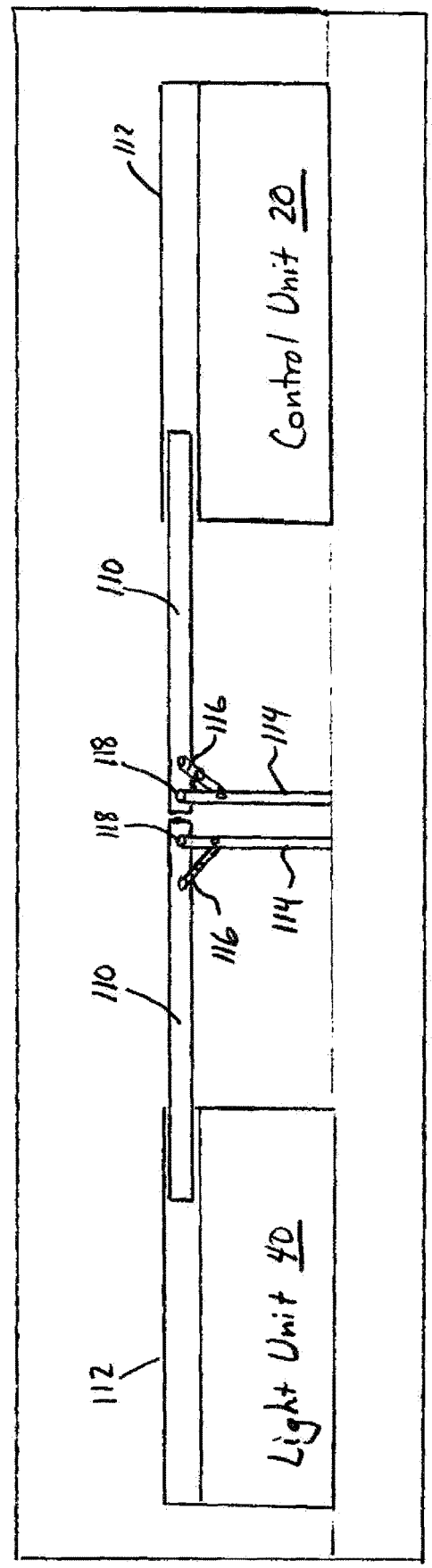

HYBRID POWER SYSTEM FOR LIGHTING AND OTHER USES

BACKGROUND

The present disclosure relates to a hybrid power system for providing a reliable source of electrical power under a wide range of conditions.

BACKGROUND OF THE RELATED ART

A photovoltaic (PV) system is an electrical power system that includes solar panels designed to convert sunlight directly into usable emission-free electrical power. Photovoltaic systems may also include an inverter to convert direct current output from the solar panels to alternating current that is suitable for powering the electrical appliances and devices used in residences and businesses. An electrical power system that is not connected to an electrical grid may be referred to as "off-grid" and does not require components for interfacing with the electrical grid. Photovoltaic systems may further include an energy storage device, such as a rechargeable battery, to store surplus energy for subsequent use. Often, the energy stored in the storage device is used at a time when there is insufficient sunlight for the solar panels to supply the momentary demand for electricity. Accordingly, a photovoltaic system may be an important part of a plan to reduce the carbon footprint of a given project, facility or company.

BRIEF SUMMARY

Some embodiments provide a system comprising a control unit, a solar unit and a light unit. The control unit may include a main distribution box having a plurality of alternating current connections, a combustion engine electrical generator having an alternating current output coupled to one of the alternating current connection(s) of the main distribution box, and a first plurality of photovoltaic panels having a direct current output coupled to a first solar inverter that converts the direct current output to an alternating current output that is coupled to one of the alternating current inputs of the main distribution box. The solar unit may include a second plurality of photovoltaic panels having a direct current output coupled to a second solar inverter that converts the direct current output to an alternating current output that is detachably coupled to one of the alternating current inputs of the main distribution box using a cable, and a first rechargeable battery unit coupled to a first battery inverter. The first battery inverter may be controlled to convert alternating current to direct current for charging the first battery unit and to convert direct current discharged from the first rechargeable battery to alternating current, and the first battery inverter may be detachably coupled to one of the alternating current inputs of the main distribution box using a cable. The light unit includes an array of area lights supported by a mast, a third plurality of photovoltaic panels having a direct current output coupled to a third solar inverter that converts the direct current output to an alternating current output, and a second rechargeable battery unit coupled to a second battery inverter. The second battery inverter may be controlled to convert alternating current to direct current for charging the second rechargeable battery unit and to convert direct current discharged from the second rechargeable battery to alternating current, and the second battery inverter is coupled to the third solar inverter and the array of area lights and is detachably coupled to one of the alternating current connections of the main distribution box using a cable.

Some embodiments provide a kit comprising a control unit shipping container, a solar unit shipping container, a plurality of light unit shipping containers, a solar unit cable, and plurality of light unit cables. The control unit shipping container includes a main distribution box having a plurality of alternating current connections, a controller in digital communication with a bus network, a combustion engine electrical generator having an alternating current output coupled to one of the alternating current connections of the main distribution box, and a first plurality of photovoltaic panels having a direct current output coupled to a first solar inverter that converts the direct current output to an alternating current output that is coupled to one of the alternating current inputs of the main distribution box, wherein the first solar inverter is connected to the bus network. The control unit further includes a first quick connect coupling having a pinout that includes a solar power conductor connected to the AC main distribution box, a battery power conductor connected to the AC main distribution box, a network wire connected to the bus network, and a plurality of second quick connect couplings, each of the second quick connect couplings having a pinout that includes a battery power conductor connected to the AC main distribution box, and a network wire connected to the bus network. The solar unit shipping container includes a second plurality of photovoltaic panels having a direct current output coupled to a second solar inverter that converts the direct current output to an alternating current output, a first rechargeable battery unit coupled to a first battery inverter that converts alternating current to direct current for charging the first rechargeable battery unit and converts direct current discharged from the first rechargeable battery unit to alternating current, and a quick connect coupling having a pinout that includes a solar power conductor connected to the second solar inverter, a battery power conductor connected to the first battery inverter, and a network wire connected to both the second solar inverter and the first battery inverter. Each of the plurality of light unit shipping containers includes an array of area lights supported by a mast, a third plurality of photovoltaic panels having a direct current output coupled to a third solar inverter that converts the direct current output to an alternating current output, a second rechargeable battery unit coupled to a second battery inverter that converts alternating current to direct current for charging the second rechargeable battery unit and converts direct current discharged from the second rechargeable battery to alternating current, and a quick connect coupling having a pinout that includes a battery power conductor connected to the second battery inverter and a network wire connected to both the third solar inverter and the second battery inverter. The solar unit cable includes a first end having a first quick connect coupling and second end having a second quick connect coupling, wherein the solar unit cable includes a solar power conductor, a battery power conductor and a network wire, and wherein the first quick connect coupling of the solar unit cable detachably couples with the quick connect coupling of the solar unit shipping container and the second quick connect coupling of the solar unit cable detachably couples with the quick connect coupling of the control unit shipping container. Each of the plurality of light unit cables includes a first end having a first quick connect coupling and a second end having a second quick connect coupling, wherein each light unit cable includes a battery power conductor and a network wire, and wherein the first quick connect coupling of each light unit cable detachably couples with one of the second quick connect couplings of the control unit shipping container.

BRIEF DESCRIPTION OF THE SEVERAL VIEWS OF THE DRAWINGS

FIG. 5A is a schematic end view of a modular unit as one of the solar panels is being deployed.

FIG. 5B is a schematic end view of the module unit after the solar panels have been deployed to an operating position and a pair of roof panels have been opened.

FIG. 6A is a cross-sectional side view of the modular unit taken along line A-A in FIG. 5B to show a light mast in a stowed position.

FIGS. 10A and 10B are side views of two modular units that each have a cable tray in a stowed position and a deployed position, respectively.

DETAILED DESCRIPTION

Figure 1:
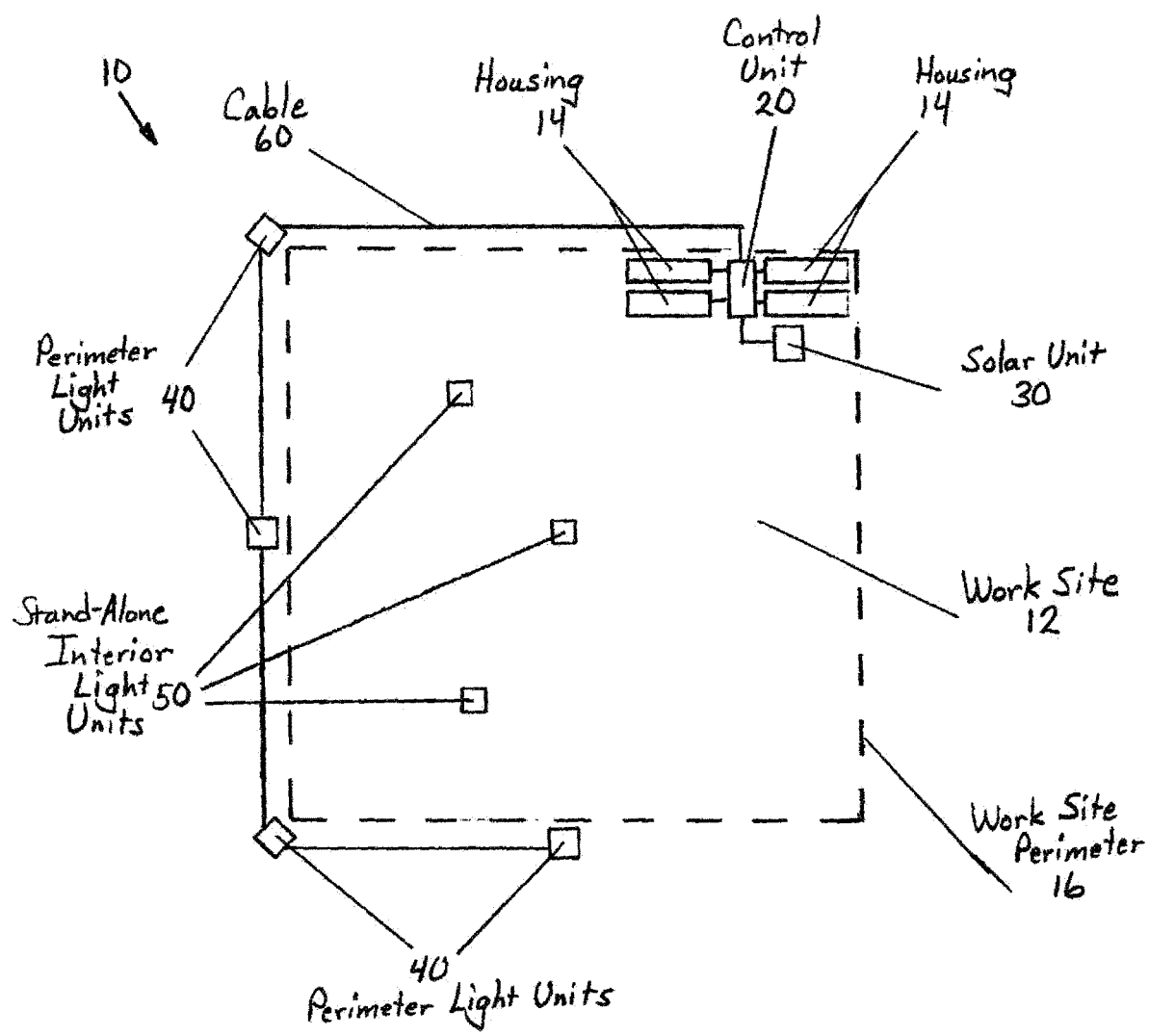
FIG. 1 is a plan view of a hybrid off-grid power and lighting system set up at a worksite.

Some embodiments provide a system include a control unit, a solar unit and a light unit. The control unit may include a main distribution box having a plurality of alternating current connections, a combustion engine electrical generator having an alternating current output coupled to one of the alternating current connections of the main distribution box, and a first plurality of photovoltaic panels having a direct current output coupled to a first solar inverter that converts the direct current output to an alternating current output that is coupled to one of the alternating current inputs of the main distribution box. The solar unit may include a second plurality of photovoltaic panels having a direct current output coupled to a second solar inverter that converts the direct current output to an alternating current output that is detachably coupled to one of the alternating current inputs of the main distribution box using a cable, and a first rechargeable battery unit coupled to a first battery inverter. The first battery inverter may be controlled to convert alternating current to direct current for charging the first battery unit and to convert direct current discharged from the first rechargeable battery to alternating current, and the first battery inverter may be detachably coupled to one of the alternating current inputs of the main distribution box using a cable. The light unit includes an array of area lights supported by a mast, a third plurality of photovoltaic panels having a direct current output coupled to a third solar inverter that converts the direct current output to an alternating current output, and a second rechargeable battery unit coupled to a second battery inverter. The second battery inverter may be controlled to convert alternating current to direct current for charging the second rechargeable battery unit and to convert direct current discharged from the second rechargeable battery to alternating current, and the second battery inverter is coupled to the third solar inverter and the array of area lights and is detachably coupled to one of the alternating current connections of the main distribution box using a cable.

In some embodiments, the control unit may further include a first shipping container that secures the combustion engine electrical generator, the first plurality of photovoltaic panels, the first solar inverter, and the AC main distribution box during transportation and use. Similarly, the solar unit may further include a second shipping container that secures the second plurality of photovoltaic panels, the second solar inverter, the first battery inverter, and the first energy storage device. Still further, the light unit may further include a third shipping container that secures the third plurality of photovoltaic panels, the third solar inverter, the second battery inverter, and the second energy storage device.

In some embodiments, the first shipping container may include a first suspended cable tray that is slid ably deployable from an end of the first shipping container and is extendable toward one of the third shipping containers. The third shipping container may similarly include a second suspended cable tray that is slidably deployable from an end of the third shipping container and is extendable toward the first shipping container. The first and second cable trays may form a continuous support for an umbilical cable having a first end connected to the control unit and a second end connected to the light unit of the third shipping container.

In some embodiments, the first plurality of photovoltaic panels are hingedly coupled to the first shipping container, the second plurality of photovoltaic panels are hingedly coupled to the second shipping container, and the third plurality of photovoltaic panels are hingedly coupled to the third shipping container. For example, the photovoltaic panels may form a side panel of the shipping container and hinge along an upper end of the side panel. The first shipping container may include a first actuator for moving the first plurality of photovoltaic panels from a stowed position to a deployed position, the second shipping container may include a second actuator for moving the second plurality of photovoltaic panels from a stowed position to a deployed position, and the third shipping container may include a third actuator for moving the third plurality of photovoltaic panels from a stowed position to a deployed position. Alternatively, the panels may be manually moved and supported in the deployed position with an elongated rigid brace.

In some embodiments, a first set of hydraulic outriggers may be coupled to the first shipping container for raising the first shipping container a distance above a first delivery trailer and lowering the first shipping container to rest on a first support structure, such as the ground of a rock or concrete pad. Similarly, a second set of hydraulic outriggers may be coupled to the second shipping container for raising the second shipping container a distance above a second delivery trailer and lowering the second shipping container to rest on a second support structure, and a third set of hydraulic outriggers may be coupled to the third shipping container for raising the third shipping container a distance above a third delivery trailer and lowering the third shipping container to rest on a third support structure. A set of outriggers for one of the shipping containers may include four outriggers, such that the shipping container may be raised evenly above the delivery trailer in a stable manner. In one option, the first set of hydraulic outriggers may be further adapted to stabilize the first shipping container in an upright position with the first shipping container supported by the first support structure. Accordingly, the set of outriggers may continue to serve a useful purpose when not being used to raise and lower the shipping container. Similarly, the second set of hydraulic outriggers may be further adapted to stabilize the second shipping container in an upright position with the second shipping container supported by the second support structure, and the third set of hydraulic outriggers may be further adapted to stabilize the third shipping container in an upright position with the third shipping container supported by the third support structure.

In some embodiments, the light unit includes a telescoping cylinder that is secured to the third shipping container and upwardly extendable to form an upright mast, wherein the upright mast has a distal end supporting the array of area lights. In one option, the telescoping cylinder may be hingedly secured to the third shipping container and pivotable between a horizontal stowed position within the third shipping container and an upright deployable position extending above the third shipping container. In another option, a wind generator may be supported by the distal end of the upright mast.

In some embodiments, the first shipping container may have a floor including or supporting a track mechanism for securing any one of a plurality of electrical generators having different physical connector patterns and/or dimensions. The track mechanism may include a pair of tracks and a pair of rails including at least one rail that is slid able along the pair of tracks. Each rail includes bolts holes spaced apart to match one dimension, such as a width, of a connector pattern for a first electrical generator as well as a connector pattern for a second electrical generator. Furthermore, at least one rail is slid able along the pair of tracks to a distance from the other rail to match another dimension, such as length, of the connector pattern for the first electrical generator as well as the connector pattern for the second electrical generator. Accordingly, the track mechanism may be quickly adapted between different physical connector patterns and/or dimensions for supporting and securing either the first or second electrical generators.

In some embodiments, the system may further include a first umbilical cable for connecting the solar unit to the control unit, wherein the first umbilical cable supports AC voltage transmission from the second solar inverter to the AC main distribution box, AC voltage transmission between the first battery inverter and the AC main distribution box, and communication signal transmission from a controller in the control unit to the second solar inverter and the first battery inverter in the solar unit. In one option, the first umbilical cable may have a first end with a first quick connect coupling for connecting to a first mating coupling on the control unit and may have a second end with a second quick connect coupling for connecting to a second mating coupling on the solar unit.

In some embodiments of the system, the light unit is one of a plurality of light units. Accordingly, the system may further include a plurality of umbilical cables, each umbilical cable adapted for connecting a particular one of the plurality of light units to the control unit. Each umbilical cable supports AC voltage transmission from the third solar inverter of the particular light unit to the AC main distribution box, AC voltage transmission between the third battery inverter of the particular light unit to the AC main distribution box, and communication signal transmission from a controller in the control unit to the third solar inverter and the third battery inverter in the particular light unit. In one option, the control unit may include a facility power output from the AC main distribution box for supplying electricity to an external power consuming unit.

In some embodiments, the system may further include an automatic transfer switch in communication with the combustion engine electrical generator for turning on the combustion engine electrical generator in response to sensing that an electrical demand on outputs from the AC main distribution exceeds the electrical supply available from the first, second and third pluralities of photovoltaic panels and the first and second energy storage devices.

Embodiments of the system may further include a controller. For example, the controller may be in digital communication with the first, second and third solar inverters and the first and second battery inverters. Furthermore, the controller may be in digital communication with a first power meter that measures an amount of power input to the AC main distribution board from the combustion engine electrical generator and a second power meter that measure an amount of power output from the AC main distribution board to an external power consuming unit. The controller may execute logic that controls when the batteries are charging or discharging, and when to run the combustion engine electrical generator. Furthermore, the controller may utilize a model of predicted power consumption and power generation to optimize the use of photovoltaic power or other renewable energy source. In some embodiments, the controller may execute control logic to control the first, second and third solar inverters, the first and second battery inverters, and the combustion engine electrical generator to maximize use of power from the photovoltaic panels. Still further, the controller may receive operating data from any component of the system, such as the first, second and third solar inverters, the first and second battery inverters, and the combustion engine electrical generator.

In some embodiments, a network gateway may convert digital communication in a first network using a first serial communication protocol and a second network using a second serial communication protocol, wherein the first network includes the first, second and third solar inverters and the first and second battery inverters, and wherein the second network includes the controller. In one option, the first serial communication protocol may be the RS485 standard and the second serial communication protocol may be the Ethernet standard.

In some embodiments, a modem may be in communication with the controller, such that the modem enables the controller to communicate with a remote computer over a wide area network. Optionally, the controller may provide a software interface for enabling the remote computer to monitor power production and consumption within the system. Furthermore, some processing may be performed by a remote application server to reduce the load on the controller.

Some embodiments provide a kit that includes a control unit shipping container, a solar unit shipping container, a plurality of light unit shipping containers, a solar unit cable, and plurality of light unit cables. The control unit shipping container includes a main distribution box having a plurality of alternating current connections, a controller in digital communication with a bus network, a combustion engine electrical generator having an alternating current output coupled to one of the alternating current connections of the main distribution box, and a first plurality of photovoltaic panels having a direct current output coupled to a first solar inverter that converts the direct current output to an alternating current output that is coupled to one of the alternating current inputs of the main distribution box, wherein the first solar inverter is connected to the bus network. The control unit further includes a first quick connect coupling having a pinout that includes a solar power conductor connected to the AC main distribution box, a battery power conductor connected to the AC main distribution box, a network wire connected to the bus network, and a plurality of second quick connect couplings, each of the second quick connect couplings having a pinout that includes a battery power conductor connected to the AC main distribution box, and a network wire connected to the bus network. The solar unit shipping container includes a second plurality of photovoltaic panels having a direct current output coupled to a second solar inverter that converts the direct current output to an alternating current output, a first rechargeable battery unit coupled to a first battery inverter that converts alternating current to direct current for charging the first rechargeable battery unit and converts direct current discharged from the first rechargeable battery unit to alternating current, and a quick connect coupling having a pinout that includes a solar power conductor connected to the second solar inverter, a battery power conductor connected to the first battery inverter, and a network wire connected to both the second solar inverter and the first battery inverter. Each of the plurality of light unit shipping containers includes an array of area lights supported by a mast, a third plurality of photovoltaic panels having a direct current output coupled to a third solar inverter that converts the direct current output to an alternating current output, a second rechargeable battery unit coupled to a second battery inverter that converts alternating current to direct current for charging the second rechargeable battery unit and converts direct current discharged from the second rechargeable battery to alternating current, and a quick connect coupling having a pinout that includes a battery power conductor connected to the second battery inverter and a network wire connected to both the third solar inverter and the second battery inverter. The solar unit cable includes a first end having a first quick connect coupling and second end having a second quick connect coupling, wherein the solar unit cable includes a solar power conductor, a battery power conductor and a network wire, and wherein the first quick connect coupling of the solar unit cable detachably couples with the quick connect coupling of the solar unit shipping container and the second quick connect coupling of the solar unit cable detachably couples with the quick connect coupling of the control unit shipping container. Each of the plurality of light unit cables includes a first end having a first quick connect coupling and a second end having a second quick connect coupling, wherein each light unit cable includes a battery power conductor and a network wire, and wherein the first quick connect coupling of each light unit cable detachably couples with one of the second quick connect couplings of the control unit shipping container.

Embodiments of the kit may include any one or more component or feature of the system, and the system may include any one or more component or feature of the kit. In addition, method embodiments may include any one or more method of setting up and/or using the kits and/or the system. Still further, certain methods may be embodied as program instructions for implementing or initiating any one or more aspects of the methods described herein. For example, embodiments may include a computer program product comprising a non-volatile computer readable medium and non-transitory program instructions embodied therein, the program instructions being configured to be executable by a processor to cause the processor to perform operations of the method. Other embodiments may provide an apparatus including at least one non-volatile storage device storing program instructions and at least one processor configured to process the program instructions, wherein the program instructions are configured to, when processed by the at least one processor, cause the apparatus to perform various operations.

Although some embodiments have been described as "off-grid" systems or kits, the disclosed embodiments are also compatible with an "on-grid" system. A system that is connected to an electrical grid can both draw power from the grid and supply excess power to the grid. To enable the connection to the grid, the system may include a grid-tied inverter that synchronizes the frequency of the alternating current to the grid frequency. For example, the grid-tied inverter may implement a phase-locked loop (PLL). Other than this connection with the grid, an "on-grid" system may be same as any one of the disclosed "off-grid" embodiments.

FIG. 1 is a plan view of a hybrid off-grid power and lighting system 10 set up at a worksite 12 having a perimeter 16 (outlined with a dashed line). The system shown includes a control unit 20, a solar unit 30, four perimeter light units 40, and three standalone interior light units 50. However, the system is modular and may support more units, fewer units, and/or different combinations of units.

Power generated by the system 10 is used to power lights, such as stadium style lights, that illuminate the entire worksite 12. However, the system may further provide power used for other purposes, such as the facility power for four office/housing units 14 that provide shelter for workers staying at the worksite. Power and control signals may be transmitted between the control unit, the solar unit and the perimeter light units with cables 60 that extend between the units (only one cable is labeled). In a preferred configuration, each perimeter light unit 40 has its own cable 60 that extends directly to the control unit 20.

The standalone interior light units 50 may be functionally similar to the perimeter light units 40, except that they may be physically smaller and mobile, may supply their own power, and are not connected to the rest of the system by cables. Furthermore, the interior light units 50 may provide spot lighting, whereas the perimeter light units 40 preferably provide area lighting. The modular hybrid system can be scaled to accommodate a broad range of surface area lighting needs as well as multi-house deployments. In one non-limiting example, the system may provide 20-300 kW of available power.

The hybrid off-grid power and lighting system 10 may be scalable, modular, and mobile. The system is compliant with OSHA (Occupational Safety and Health Administration) regulations. The system provides worksite lighting and an ample power supply for a broad range of off-grid applications, including oil and gas operations, construction projects, emergency response, and outdoor events. The modular deployment can be sized to scale to specific lighting and other power needs. The system also includes a level of redundancy in power generation and storage. It is a further benefit that the system may include one or more renewable energy sources, such as photovoltaic panels and wind generators, to reduce carbon emissions. In some implementations, it is estimated that the system may reduce fuel use by 65% by using solar panels to charge rechargeable battery units as the primary source of power. As a result, combustion engine electrical generators are only required for about 6 hours out of any day. However, when the combustion engine electrical generator is running, any of the power output by the combustion engine electrical generator that is not consumed by the lights, housing or other facilities is used to recharge the batteries. So, while the photovoltaic panels produce power that reduces the combustion engine electrical generator run time, the system design allowing excess electrical generator power to charge the batteries also contributes to a reduction in combustion engine electrical generator run time. Embodiments that employ remote monitoring and control may quickly respond to any component issues or failures.

Figure 2:
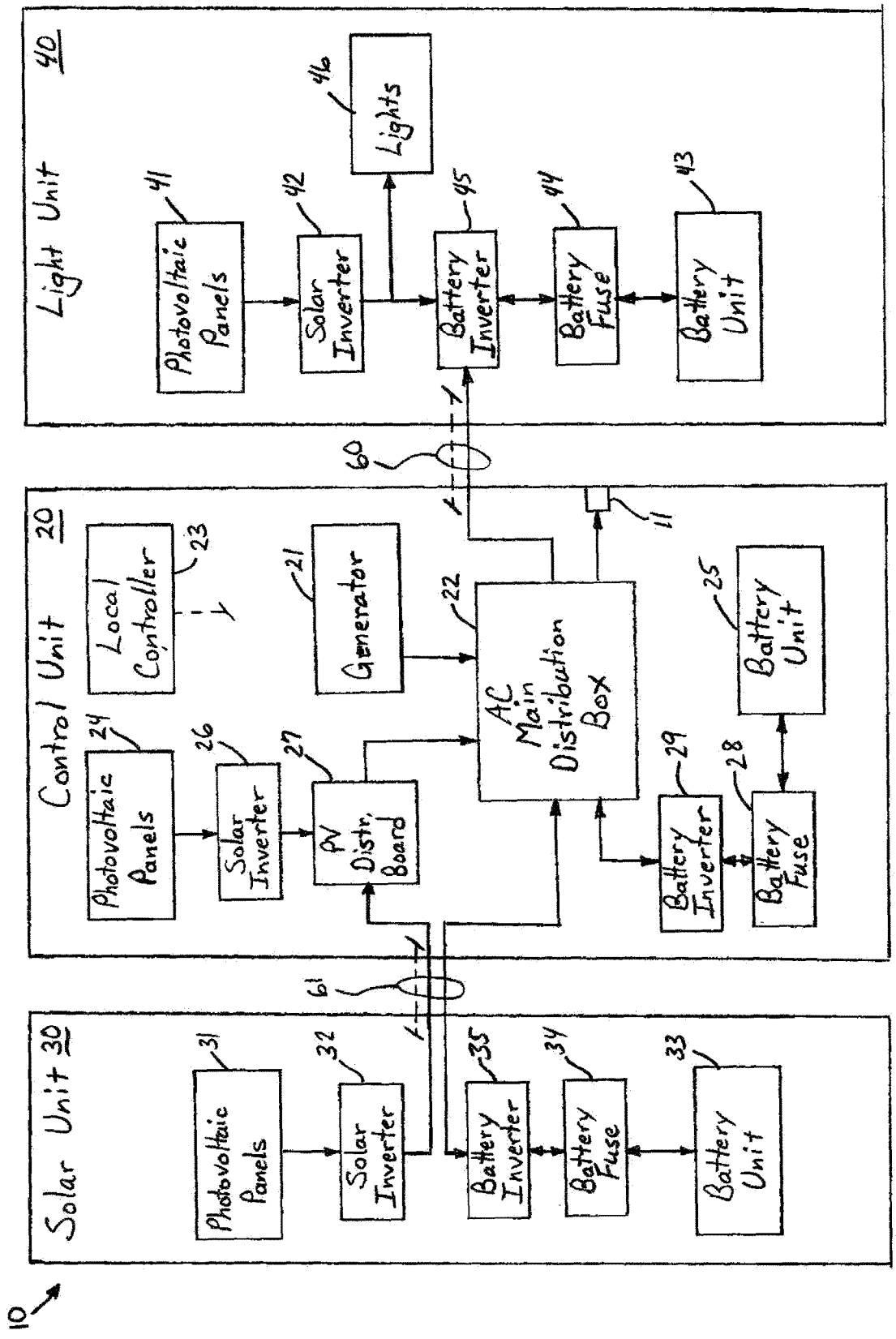
FIG. 2 is an electrical system diagram for a modular hybrid off-grid power and lighting system that includes a solar unit, a control unit and one or more light unit.

FIG. 2 is an electrical system diagram for the modular hybrid off-grid power and lighting system 10 that includes a solar unit 30, a control unit 20 and one or more light units 40. The light unit 40 is shown as a perimeter light unit that is coupled to the control unit 20 with the cable 60, but the diagram may also be representative of a standalone light unit 50 other than the cable connection.

Figure 3:
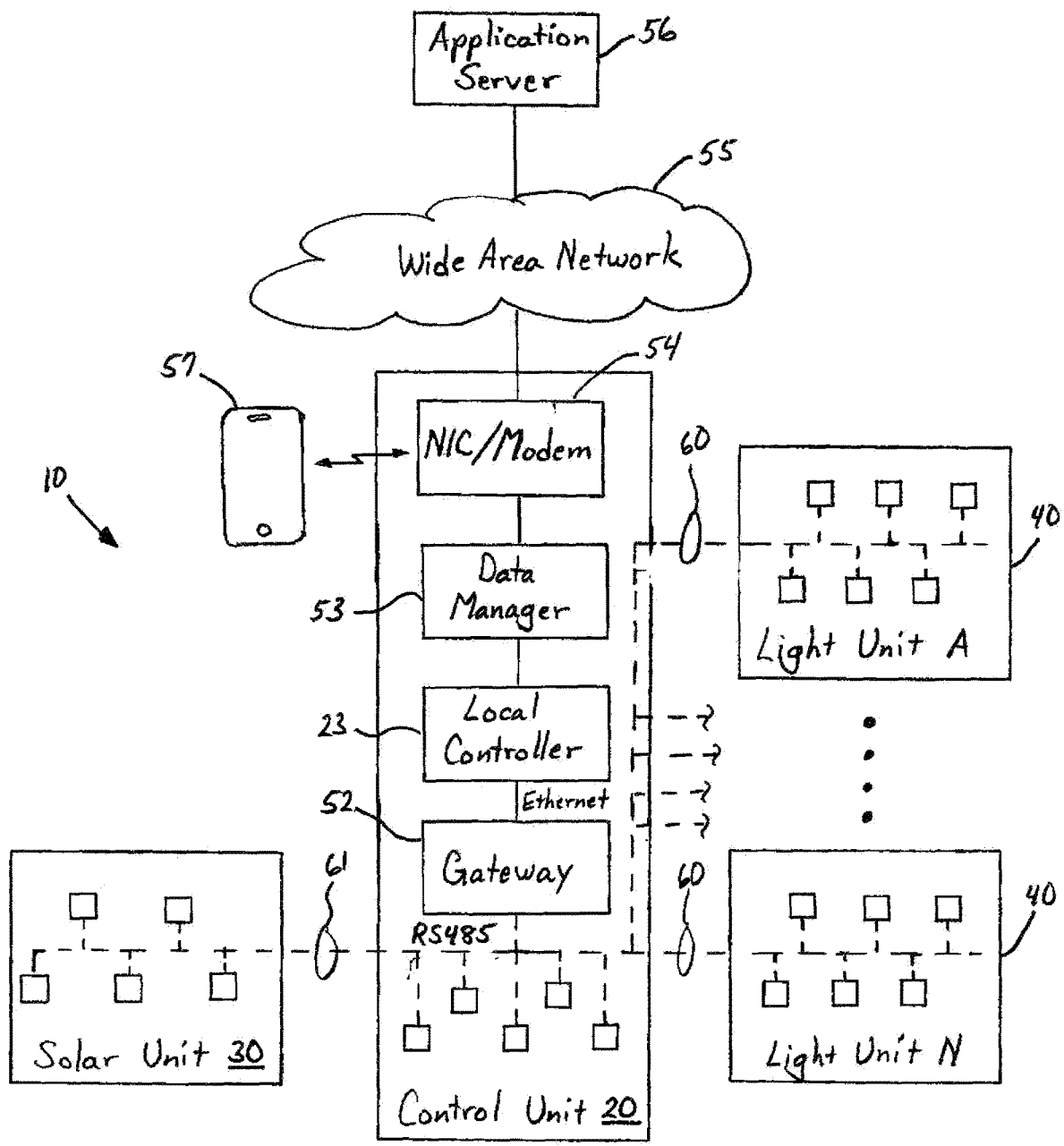
FIG. 3 is a control system diagram for the modular hybrid off-grid power and lighting system of FIG. 2.

The control unit 20 includes a local controller 23 and other communications equipment (as shown in FIG. 3). The control unit 20 also includes an appropriately sized combustion engine electrical generator 21, photovoltaic panels (solar panels) 24, and a battery unit 25. Although the combustion engine electrical generator 21 has its AC voltage output connected directly to an AC main distribution box 22, the photovoltaic panels (solar panels) 24 provide DC voltage to the solar inverter 26 which provides AC voltage to the PV (Photovoltaic) distribution board 27. Along with AC voltage from the solar inverter of the solar unit 30, the PV distribution board 27 provides AC voltage to a separate input to the AC main distribution board 22. The battery unit 25 is also coupled to the AC main distribution board 22 via the battery fuse 28 and the battery inverter 29. The battery inverter 29 and battery fuse 28 enable both charging and discharging of the battery unit 25.

In one specific implementation, the control unit 20 may be built into a 40 foot shipping container and may include six 400 W solar panels 24, a 33 kW lithium battery bank or unit 25, an 80 kW diesel engine electrical generator 21, a 550 gallon fuel tank (not shown), quick connect cables and connectors (see FIGS. 8A and 8B), and components for remote monitoring and control of the system (see FIG. 3). Power generated by the control unit 20 may be used to operate the local controller 23 and other communication equipment, and may provide facility power to an external device via a port or outlet 11, may be directed to the battery unit 25 of the control unit, or may be directed to the battery units of the solar unit 30 and/or light unit 40. The control unit 20 may manage the load of the deployed system and determines when the electrical generator 21 is needed to provide adequate power for the lights or other uses. For example, the AC main distribution box 22 may receive AC power from the solar unit 30 and the electrical generator 21 and the local controller 23 may switch on the electrical generator 21 when the batteries are approaching their discharge limit.

The solar unit 30 includes photovoltaic panels 31 that supply DC voltage to a solar inverter 32 that converts the DC voltage to AC voltage that is output to the control unit. The solar unit 30 also includes a battery unit 33 that is coupled to the AC main distribution board 22 of the control unit 20 via the battery fuse 28, the battery inverter 29 and a cable 61. The battery inverter 35 and battery fuse 34 enable both charging and discharging of the battery unit 33. Accordingly, the battery unit 33 may be charged with electrical power received over the cable 61 from the AC main distribution box 22 of the control unit. The solar unit 30 may be provided in the system 10 to provide additional solar energy capture and battery storage to help scale the solar contribution needed for the off-grid system.

In one specific implementation, the solar unit may be built into a 20 foot shipping container and may include eighteen 400 W solar panels 31, a 33 kW lithium battery bank or unit 33, and a quick connect cable 61. The battery unit may include thirty-three temperature-controlled Li-ion batteries, and a series of inverters operating in a master-slave relationship to sync the AC current going to the control unit.

The light unit 40 is somewhat similar to a solar unit, except that the light unit includes lights 46 such as light-emitting diode (LED) arrays. Another difference in the embodiment shown is that battery unit 43 may be charged with power from the AC main distribution board 22, but light unit 40 does not provide power to the control unit 20. However, the light unit 40 includes photovoltaic panels 41 that supply DC voltage to a solar inverter 42 that converts the DC voltage to AC voltage that is output to the lights 46 and/or the battery unit 43 via the battery inverter 45 and the battery fuse 44. The battery inverter 45 and battery fuse 44 enable both charging and discharging of the battery unit 43. Accordingly, the battery unit 43 may be charged with electrical power received over the cable 60 from the AC main distribution box 22 of the control unit or with electrical power generated by the photovoltaic panels 41 of the light unit 40 itself.

In one specific implementation, the perimeter light unit 40 may be built into a 20 foot shipping container and may include twelve 400 W solar panels, a 22 kW lithium battery bank or unit, a 65 foot (height) telescoping mast, four 400 W LED lights, and a quick connect cable. Any number of perimeter light units 40 may be connected to the control unit 20 with a separate cable (power lines and control lines) to connect the control unit direct to each of the perimeter light units.

In a further specific example, the solar inverter 26 of the control unit 20 may be a Sunny Boy 3.0); the AC main distribution box 22 of the control unit 20 may be a SMA Multicluster Box; the solar inverter 32 of the solar unit 30 may be a Sunny Boy 7.0; the battery inverter 35 of the solar unit 30 may be provided by a Sunny Island 6049 Master and two Sunny Island 6049 Slaves; the battery fuse 34 of the solar unit 30 may be a BATFUSE B.03; the solar inverter 42 of the light unit 40 may be a Sunny Boy 3.8; the battery inverter 45 of the light unit 40 may be a Sunny Island 4548;

and the battery fuse 44 of the light unit 40 may be a BATFUSE B.01. The Sunny Boy 3.0, Sunny Boy 7.0, and Sunny Boy 3.8 are solar inverters with different power capacities and/or a different number of input/output connectors. The Sunny Island 6048 Master, Sunny Island 6048 Slave (two instances), and Sunny Island 4548 are battery inverters with different power output capacities. The BATFUSE B.03 and BATFUSE B.01 are battery fuses that differ in the number of battery inverters that may be connected to the battery fuse and the total power output (kW). Sunny Boy 3.0, Sunny Boy 7.0, Sunny Boy 3.8, Sunny Island 6048 Master, Sunny Island 6048 Slave, Sunny Island 4548, SMA Multicluster Box, BATFUSE B.03 and BATFUSE B.01 are each available from SMA Solar Technology AG of Niestetal, Germany.

It is also an option to have a wind generator replace or supplement the photovoltaic panels in any of the units 20, 30, 40. However, since the light unit 40 already includes an upright mast with heights up to about 65 feet, a wind generator may be added to the mast. For example, a wind generator may be mounted to the top of the mast with the solar panels just below the wind generator.

An interior light unit (see interior light unit 50 of FIG. 1) may be functionally similar to the light unit 40, but without a connection to another unit. In one specific implementation, an interior light unit 40 may be built on a 4 foot by 4 foot container and may have five 400 W solar panels, a 6.8 kW Li-ion battery bank, a solar inverter, and a telescopic 25 foot mast with a cluster of four 100 W LED short cast lights providing 52,000 lumens. Optionally, the interior light unit may further include a 6 kW backup combustion engine electrical generator and a 20 gallon fuel tank. The interior light units are moved more frequently to cover dynamically changing work areas. This mobile unit may be mounted on either a small trailer or a lightweight moveable skid to allow for forklift movement within the worksite.

FIG. 3 is a communication and control diagram for the modular hybrid off-grid power and lighting system 10 of FIG. 2. As previously described, the system 10 includes a control unit 20, a solar unit 30 and one or more light units 40. The local controller 23 may be part of an Ethernet network that communicates with a gateway 52. The gateway is a unit of networking hardware that allows data transfer from one network to another, typically including protocol translation. In this instance, an RX-485 protocol may be used to establish a network bus that connects to any number and combination of the components in the system 10 shown in FIG. 2. The components of the solar unit 30 are able to communicate with the network bus in the control unit 20 via a data connection through the cable 61 and the components each light unit 40 are able to communicate with the network bus in the control unit 20 via a data connection through a respective cable 60. The gateway 52 is responsible for translating protocols between the RS-485 network and the Ethernet network.

The local controller 23 supports remote monitoring and control of the system 10. The data manager 53 collects data generated by the system and available through the local controller 23. The data manager 53 may also prepare the data for transmission over a network interface controller (NIC) and/or modem 54. Using the NIC 54, the control unit 20 may communicate over a wide area network (WAN) 55, such as the Internet or cellular network, with an application server 56. The local controller 23, data manager 53 and/or application server 56 may perform diagnostics, measure usage, and generate carbon reduction reports. Furthermore, the local controller 23, data manager 53 and/or application server 56 may participate in monitoring and control of the system 10, including the components shown in FIG. 2. Furthermore, a personal computing device, such as a smartphone or tablet computer 57 may be used onsite to communicate wirelessly with the NIC 54, such that service personnel at the worksite may use the device 57 to monitor and control the system.

Figure 4A:
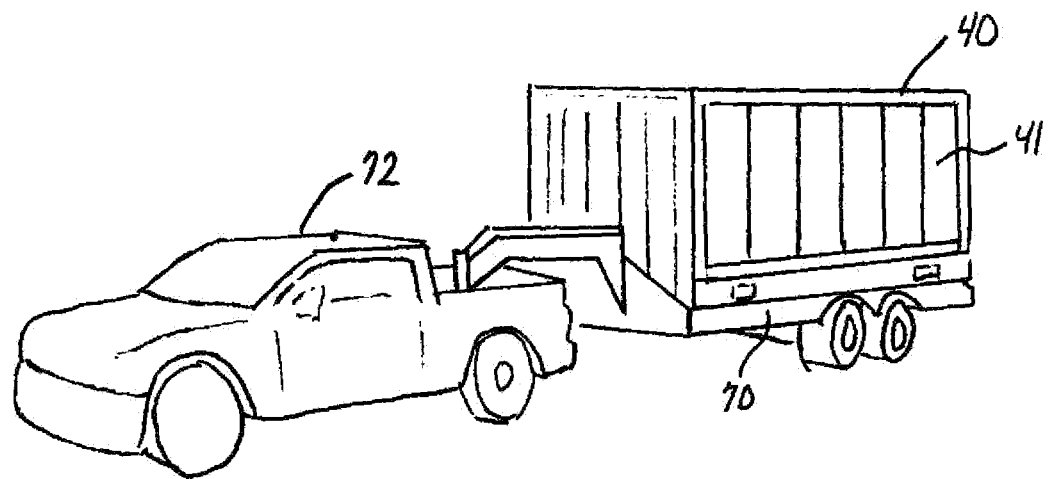
FIG. 4A is a perspective view of a modular unit of the system being delivered to a worksite on a trailer being pulled by a truck.

FIG. 4A is a perspective view of a modular unit of the system being delivered to the worksite on a trailer 70 being pulled by a truck 72. The modular unit may be any of the units 20, 30, 40, 50, but will be referred to here as a light unit 40 to simplify the discussion. The light unit 40 includes a pair of photovoltaic panels (solar panels) 41, each covering the majority of one side of the unit.

Figure 4B:
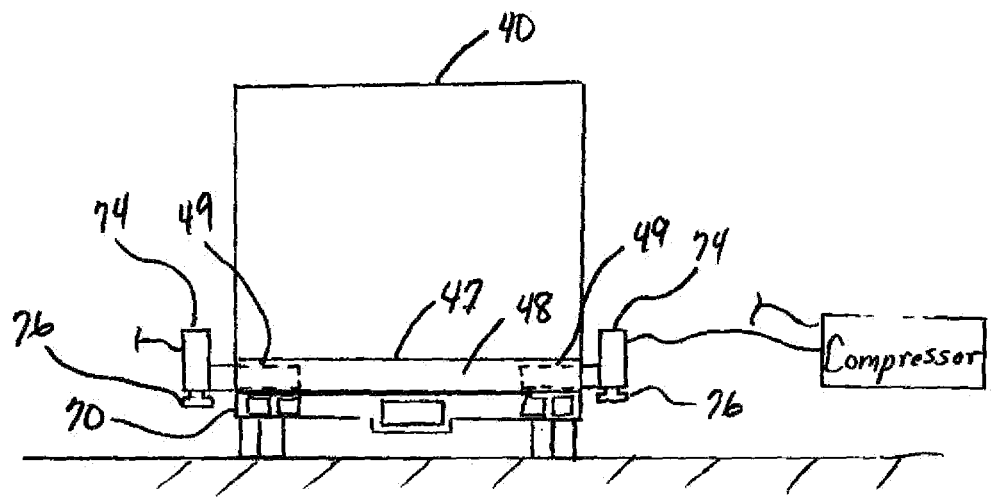
FIG. 4B is an end view of the modular unit sitting on the trailer at the worksite.
Figure 4C:
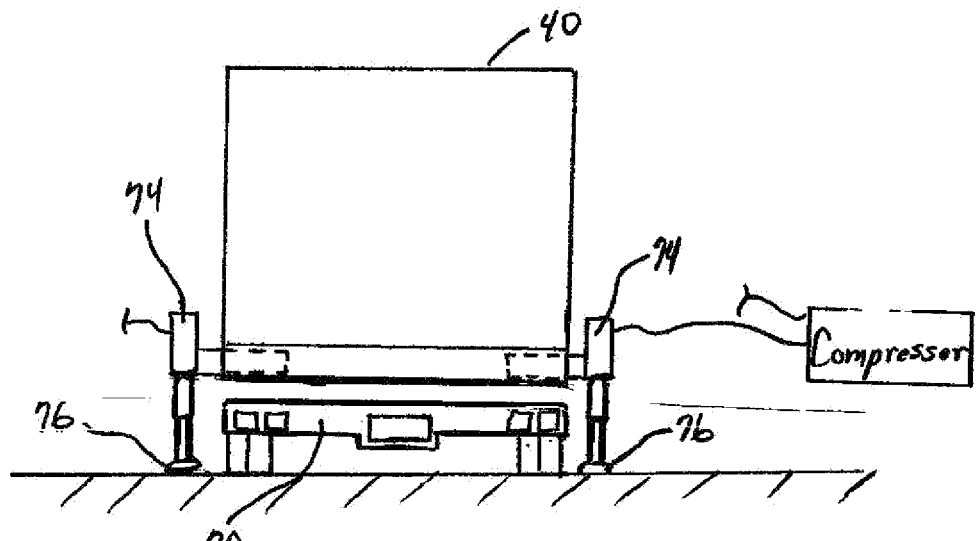
FIG. 4C is an end view of the modular unit raised above a bed of the trailer by extending a set of hydraulic or pneumatic outriggers.

FIG. 4B is an end view of the light unit 40 sitting on the trailer 70 at the worksite. The shipping container of the light unit 40 has a floor 47 with horizontal channels 48 adapted to receive a rigid arm 49 of an outrigger. A distal end of each rigid arm 49 supports a hydraulic cylinder 74 with a foot 76 at the lower end. Four such outriggers are secured about the perimeter of the floor 47. A hydraulic pump or compressor is connected to each of the four outriggers for applying hydraulic pressure to extend each cylinder FIG. 4C is an end view of the light unit 40 raised above the bed of the trailer by extending the set of hydraulic outriggers. For example, the light unit may be raised vertically until it is about one foot above the trailer 70.

Figure 4D:
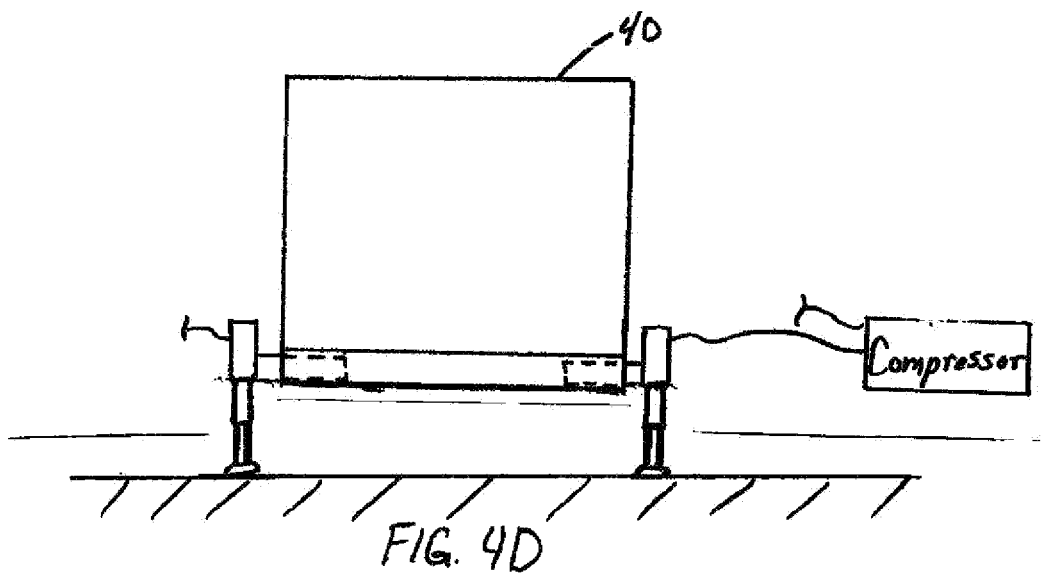
FIG. 4D is an end view of the raised modular unit after the trailer has been pulled out from beneath the modular unit.

FIG. 4D is an end view of the raised light unit 40 after the trailer has been pulled out from beneath the modular unit. As shown, the light unit 40 may be 2-3 feet above the ground.

Figure 4E:
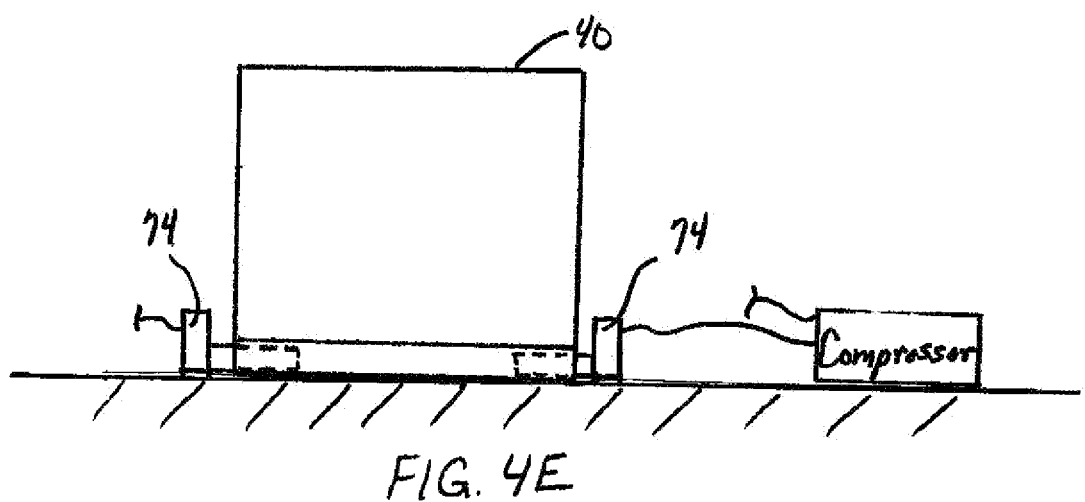
FIG. 4E is an end view of the modular unit resting on the ground as a result of retracting the set of hydraulic or pneumatic outriggers.

FIG. 4E is an end view of the light unit 40 resting on the ground as a result of retracting the set of hydraulic cylinders 74. Preferably, the rigid arms 49 will stay horizontally extended, maintaining contact with the ground to function as stabilizers that prevent tipping of the light unit 40 in the case of heavy wind or storms.

FIG. 5A is a schematic end view of a light unit 40 as one of the two sets of solar panels 41 is being deployed. Each panel 41 has an upper edge with a hinged connection 80 to the shipping container. Accordingly, each solar panel 41 may swing upward so that the photovoltaic cells face toward the sun.

FIG. 5B is a schematic end view of the light unit 40 after the solar panels 41 have been deployed to an operating position and a pair of roof panels 82 have been opened by sliding apart. The solar panels 41 may be moved to the operating position shown with an actuator or by manual force. The element 84 may represent an actuator or a manual brace. With an actuator, the system may optionally provide control of the angle of the panels 82 to maximize solar energy collection.

FIG. 6A is a cross-sectional side view of the light unit 40 taken along line A-A in FIG. 5B to show a telescopic mast 90 in a stowed position. The stowed position allows the telescopic mast 90 and the lights 46 to be fully enclosed and protected within the shipping container during transportation to the worksite. As shown, the solar panel 41 is in an operating position and the roof panel 82 is open. Accordingly, the telescopic mast 90 may be subsequently deployed.

Figure 6B:
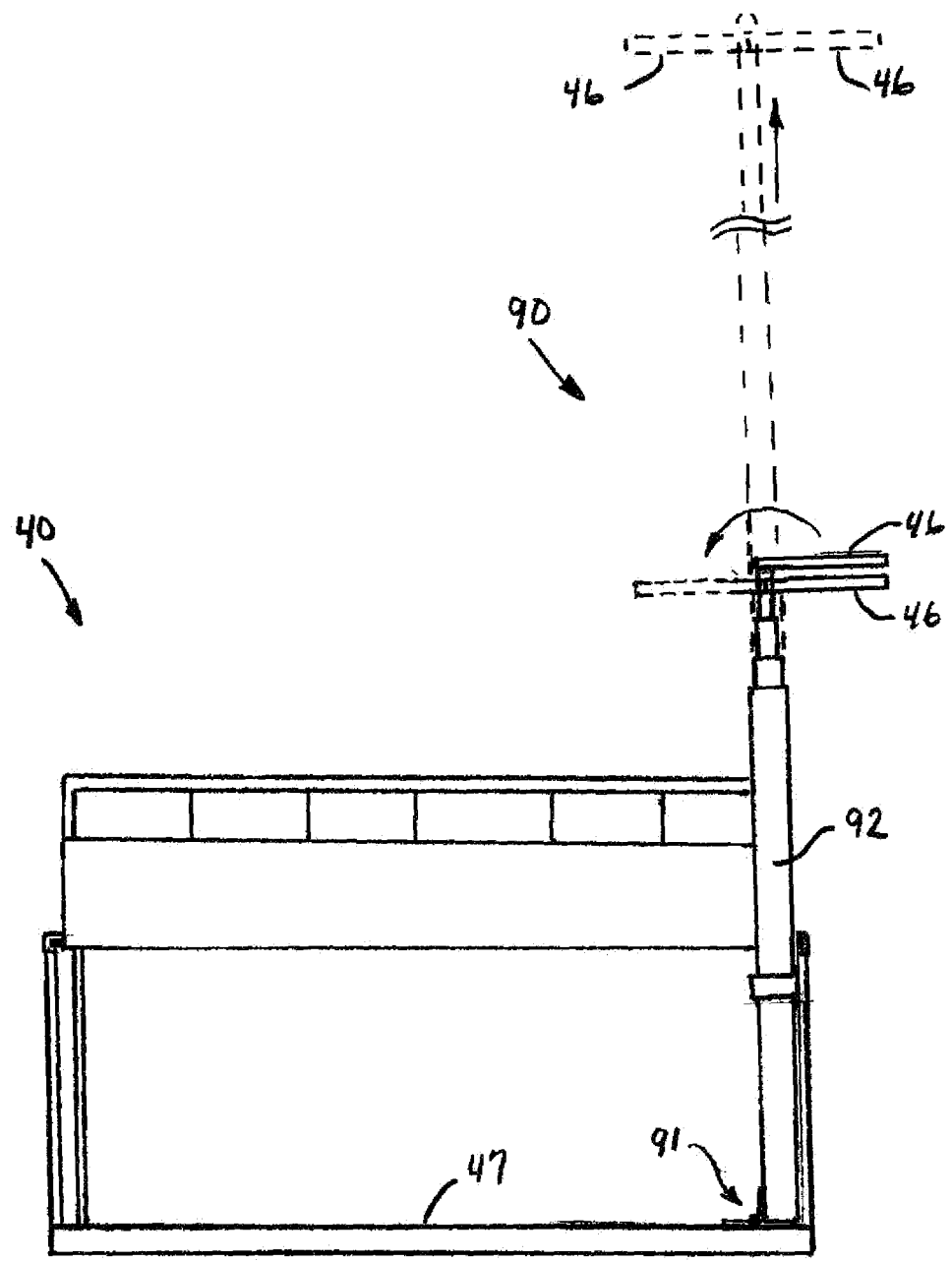
FIG. 6B is a cross-sectional side view of the module unit as shown in FIG. 6A after the light mast has been hingedly moved to an upright position and extended into a deployed position.

FIG. 6B is a cross-sectional side view of the module unit as shown in FIG. 6A after the light mast has been moved to an upright position (as shown) and extended between the roof panels 82 into a deployed position (as shown in dashed lines). A hinge 91 has one side secured to the floor 47 and one side secured to the first section 92 of the mast 90 to facilitate movement of the mast from the stowed position (FIG. 6A) and the upright position as shown. Cabling for the lights 46 may be provided in spools attached to the units. The LED lights may exceed all 1926.56 and 1915.82 OSHA foot-candle requirements for construction and land site illumination. A description of one embodiment of a mast that is pneumatically deployable is provided in reference to FIGS. 9A to 9D.

Figure 7:
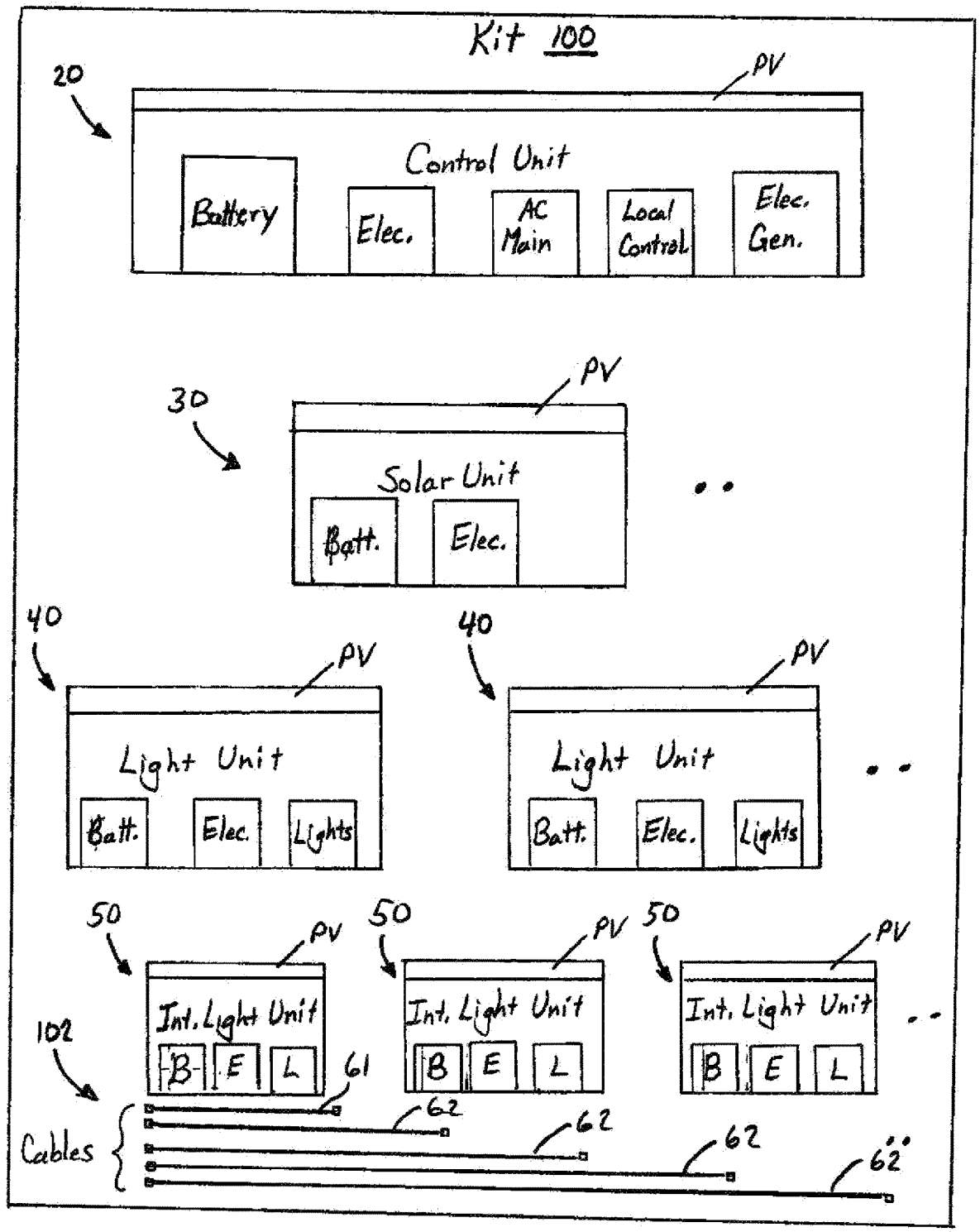
FIG. 7 is a diagram of a kit of components that may be used to set up a hybrid off-grid power and lighting system at a worksite.

FIG. 7 is a diagram of a kit 100 of components that may be used to set up a hybrid off-grid power and lighting system 10 at a worksite 12 as shown in FIG. 1. The modular components of any particular kit may vary, but the kit 100 is shown to include one control unit 20 (40 foot shipping container; 40'L×8'W×8'6"H), one solar unit 30 (20 foot shipping container; 20'L×8'W×8'6"H), four perimeter light units 40 (20 foot shipping container; 20'L×8'W×8'6"H), and three interior light units 50 (4 foot×6 foot container). Each of the units 20, 30,40, 50 are illustrated with some of the major elements of the units, but the illustration is not intended to be exhaustive. The kit 10 further includes a set of cables 102, including one solar unit cable 61 and four light unit cables 62. The kit can be easily modified to include additional components or fewer components for any particular implementation. Furthermore, the kit is beneficial in that it is easy to haul each component to the worksite and then assemble the system.

Figure 8A:
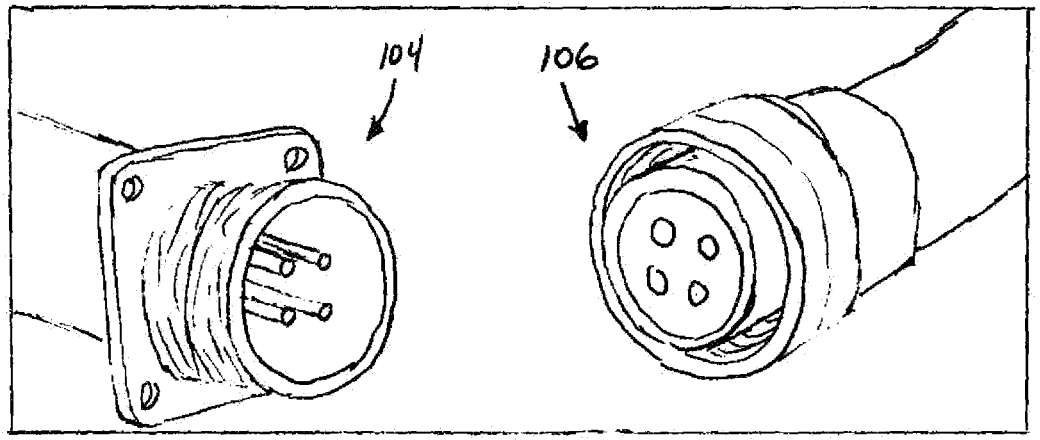
FIG. 8A is a perspective view of a mating pair of quick connect couplings.

FIG. 8A is a perspective view of a mating pair of quick connect couplings. These or similar couplings may be used on the ends of a cable (also referred to as an "umbilical"). For example, a cable may have socket-type (female) connector ends 106 and each of the control unit, solar unit and light units may have pin-type (male) connector ends 104. The mating pins and sockets may collectively carry a mix of electrical power and/or communication signals. For the embodiment shown, the connector end 106 may be aligned with the connector end 104 such that the pins will be received within the sockets. Next, the internally-threaded sleeve of the connector end 106 is turned to thread the sleeve onto the externally-threaded coupling of the connector end 104.

Figure 8B:
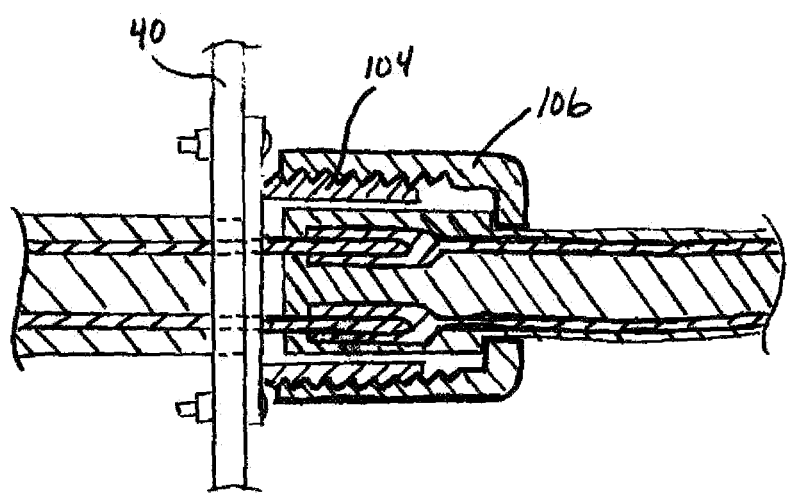
FIG. 8B is a cross-sectional side view of the pair of quick connect couplings after they have been connected to form a completed circuit between the conductors in each coupling.
Figures 9A, 9B, 9C, 9D:
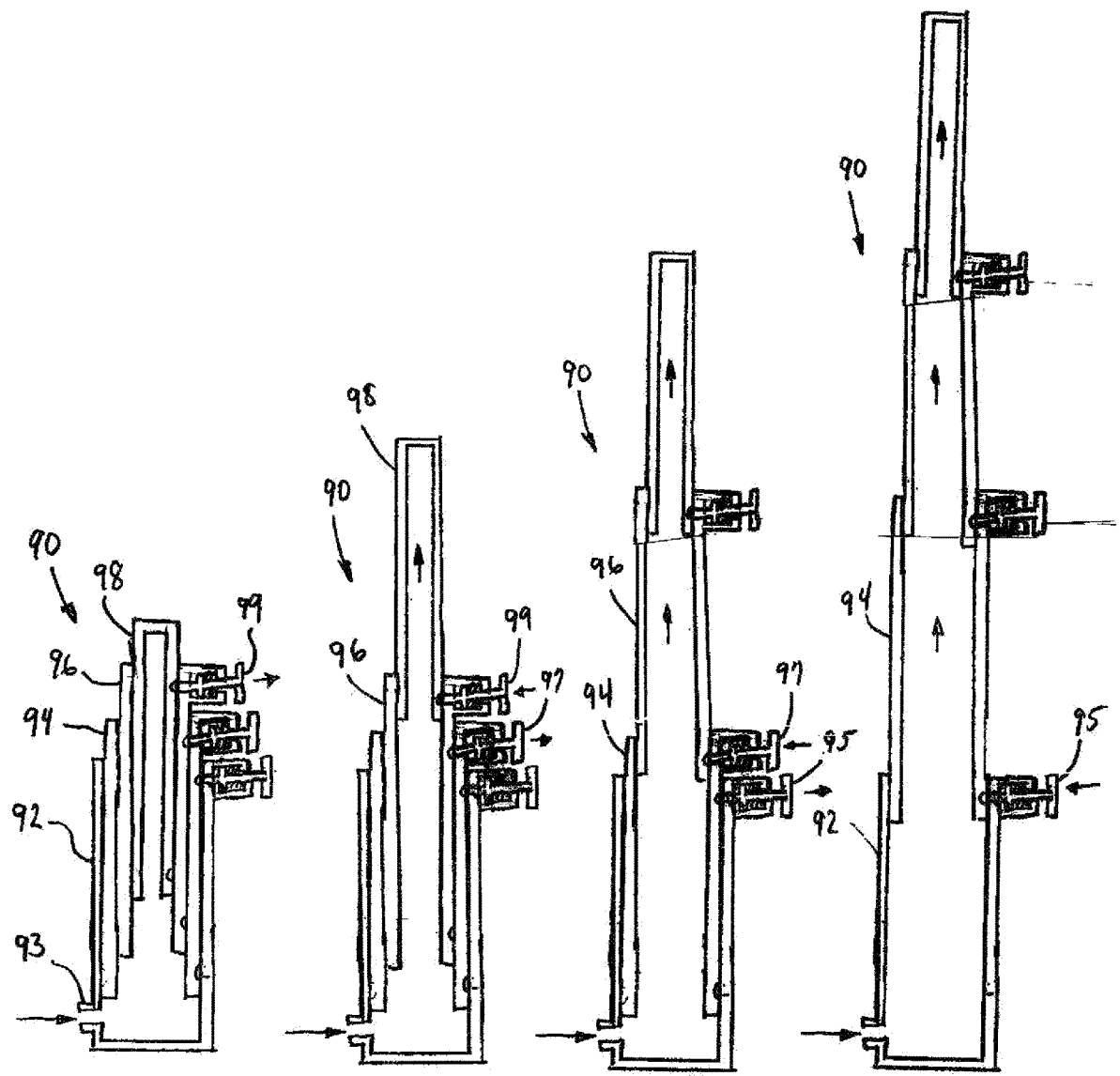
FIGS. 9A to 9D are schematic diagrams illustrating a telescopic mast being deployed with pneumatic pressure.

FIG. 8B is a cross-sectional side view of the pair of quick connect couplings 104, 106 after they have been connected to form a completed circuit between each of the pins and sockets.

FIGS. 9A to 9D are schematic diagrams illustrating a telescopic mast 90 being deployed with pneumatic pressure. The telescopic mast 90 is illustrated with 4 sections, but may have as many as 10 sections with a total deployment height of up to about 65 feet. The raising or lowering of the sections is handled pneumatically using an air compressor. In this illustration, the mast 90 includes a first (outer) section 92, a second section 94, a third section 96, and a fourth (inner) section 98 arranged in a telescopic cylinder. The second section 94 slidably engages the inner wall of the first section 92, the third section 96 slidably engages the inner wall of the second section 94, and the fourth section 98 slidably engages the inner wall of the third section 96. Each of the second, third and fourth sections has an upper and lower hole that extends only partially through the sidewall of the section to receive the distal end of a spring-loaded pin.

To raise the mast 90, an air compressor is connected to a port 93 in the first (bottom) section to apply air pressure within the telescopic mast. In reference to FIG. 9A, a spring-loaded pin 99 is manually pulled outward so that a distal end of the pin 99 is withdrawn from an upper hole in the top section 98. As the top section 98 elevates, the pin 99 may be released so that it will engage the lower hole in the top section 98. This process is repeated from each successive section from top to bottom until the desired height of the mast has been achieved or the last internal section has been elevated. With the pins of one section secured in the lower hole of the next inner section, the telescopic mast will not collapse and the compressor may be turned off. To lower the mast, the pins may be successively pulled out of the lower hole in the adjacent inner section such that the mast lowers until the pin engages the upper hole in that section. The rate of collapse may be controlled by limiting the rate at which air escapes from the telescopic mast. The pins are pulled and re-engaged from bottom to top until either the desired height of the mast has been achieved or the last section has been lowered.

FIGS. 10A and 10B are side views of two modular units that each have a cable tray 110 in a stowed position (FIG. 10A) and a deployed position (FIG. 10B), respectively. Furthermore, each cable tray 110 has a support leg 114 that is secured to the cable tray with a pivot 118. The cable tray 110 may have a length similar to the length of the shipping container that forms the units. In one example, the cable trays are each 20 feet long and may have a width of about 2 feet.

In FIG. 10B, the cable trays 110 have been pulled out from each of the two units 20, 40 that should be connected via one or more cable. Optionally, the trays 110 may be supported by bearings that reduce the force required to pull the trays out of a channel 112 and push the trays back into the channel 112. Accordingly, the two trays 110 may extend toward each other to form a 40 foot tray for supporting one or more cable above the ground where the cable will avoid damage and personnel can walk under the tray.

Once extended from the channel 112, the support legs 114 drop down into a vertical position to support the tray 110. A hinged cross brace 116 may be used to stop the support legs 114 in a vertical position. Optionally, the two trays 110 may be connected at their distal ends to provide additional support and stability. The trays 110 are then able to support heavy electrical wiring.

Figure 11A:
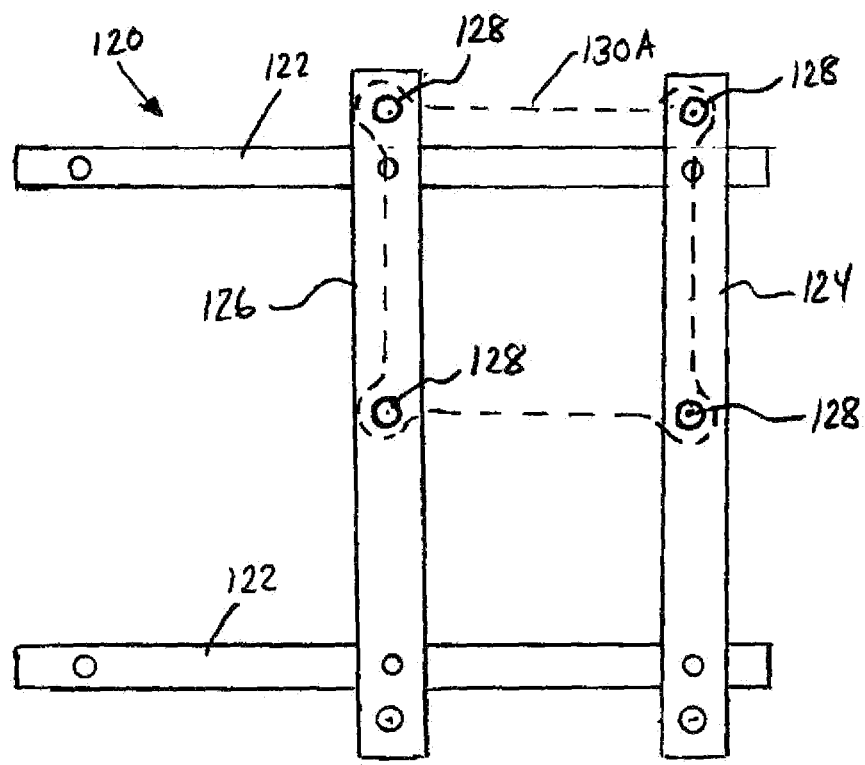
FIGS. 11A and 11B are top views of a pair of rails, including at least one sliding rail, on a pair of tracks for quickly securing either of at least two different sizes of generators.
Figure 11B:
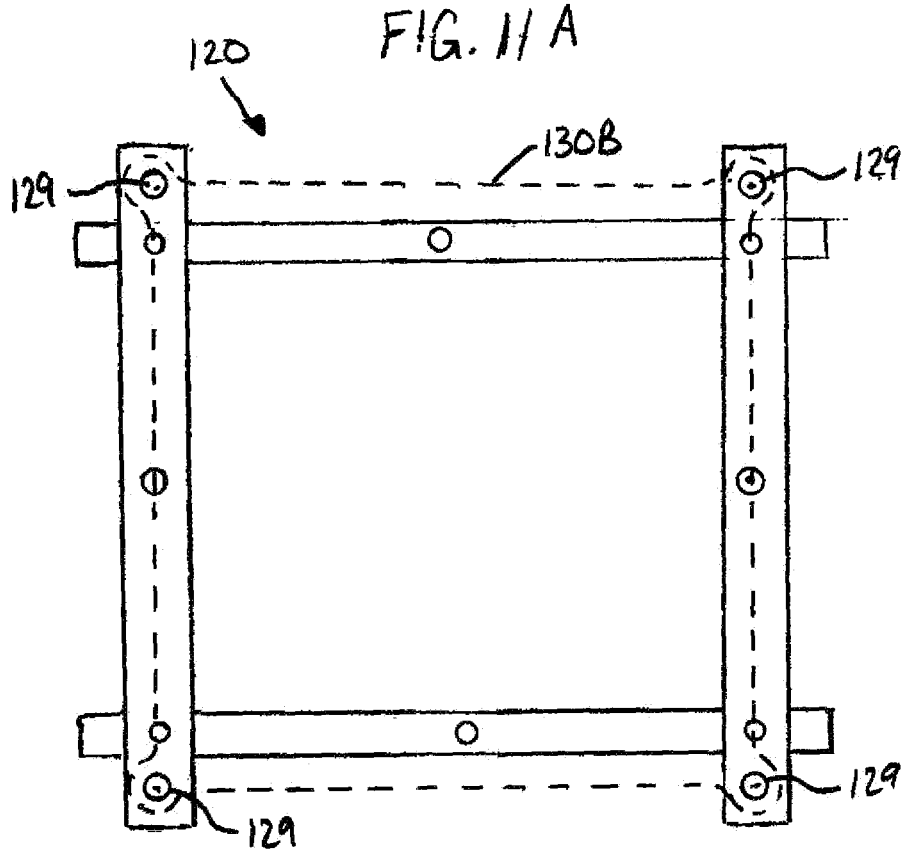

FIGS. 11A and 11B are top views of an adjustable mechanism 120 for securing different sizes of generators. The mechanism 120 includes a pair of parallel rails 124, 126 including at least one sliding rail 126, on a pair of parallel tracks 122 for quickly securing either of at least two different sizes of generators. The parallel tracks 122 may be secured to the floor of the control unit 20 and the parallel rails 124, 126 may be selectively secured in one or more positions along the tracks 122. Furthermore, each of the parallel rails 124, 126 includes multiple bolt holes and various spacings to accommodate a connector pattern of various generators. Accordingly, any one of several generators may be secured in the control unit 20 in a short amount of time, by adjusting the location of the sliding rail 126 and using a different set of bolt holes.

In FIG. 11A, the rail 124 is fixed in position and the sliding rail 126 is temporarily secured to the tracks 122 in a close position. As shown, the four bolt holes 128 are arranged to connect with the bolt hole pattern of a first small generator having a profile 130A.

In FIG. 11B, the sliding rail 126 has been slid to the left to a second position and temporarily secured to the tracks 122. Having increased the spacing between the rails 124, 126 and using a different set of bolt holes 129 on the rails 124, 126, a second larger generator having a profile 130B may be secured. Accordingly, a generator size may be selected to meet a given objective. For example, a generator with a 2 foot by 2 foot bolt pattern may be secured with the mechanism 120 configured as in FIG. 11A, and a generator with a 4 foot by 4 foot bolt pattern may be secured with the same mechanism 120 configured as in FIG. 11B.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A system, comprising:
 a control unit including:
  a main distribution box having a plurality of alternating current connections;
  a combustion engine electrical generator having an alternating current output coupled to one of the alternating current connection of the main distribution box; and
  a first plurality of photovoltaic panels having a first direct current output coupled to a first solar inverter that converts the first direct current output to an alternating current output that is coupled to one of the alternating current connections of the main distribution box; and
 a solar unit including:
  a second plurality of photovoltaic panels having a second direct current output coupled to a second solar inverter that converts the second direct current output to an alternating current output that is detachably coupled to one of the alternating current connections of the main distribution box using a cable; and
  a first rechargeable battery unit coupled to a first battery inverter, wherein the first battery inverter may be controlled to convert alternating current to direct current for charging the first battery unit and to convert direct current discharged from the first rechargeable battery to alternating current, and wherein the first battery inverter is detachably coupled to one of the alternating current connections of the main distribution box using a cable; and
 a light unit including:
  an array of area lights supported by a mast;
  a third plurality of photovoltaic panels having a third direct current output coupled to a third solar inverter that converts the third direct current output to an alternating current output; and
  a second rechargeable battery unit coupled to a second battery inverter, wherein the second battery inverter may be controlled to convert alternating current to direct current for charging the second rechargeable battery unit and to convert direct current discharged from the second rechargeable battery to alternating current, and wherein the first battery inverter is coupled to the third solar inverter and the array of area lights and is detachably coupled to one of the alternating current connections of the main distribution box using a cable.

2. The system of claim 1, wherein the control unit further comprises a first shipping container that secures the combustion engine electrical generator, the first plurality of photovoltaic panels, the first solar inverter, and the main distribution box during transportation and use; wherein the solar unit further comprises a second shipping container that secures the second plurality of photovoltaic panels, the second solar inverter, the first battery inverter, and the first rechargeable battery unit; and wherein the light unit further comprises a third shipping container that secures the third plurality of photovoltaic panels, the third solar inverter, the second battery inverter, and the second rechargeable battery unit.

3. The system of claim 2, wherein the light unit includes a telescoping cylinder that is secured to the third shipping container and extendable to form an upright mast, wherein the upright mast has a distal end supporting the array of area lights.

4. The system of claim 3, wherein the telescoping cylinder is hingedly secured to the third shipping container and pivotable between a horizontal stowed position within the third shipping container and an upright deployable position extending above the third shipping container.

5. The system of claim 3, further comprising:
 a wind generator supported by the distal end of the upright mast.

6. The system of claim 2, further comprising:
 a first set of hydraulic outriggers coupled to the first shipping container for raising the first shipping container a distance above a first delivery trailer and lowering the first shipping container to rest on a first support structure;
 a second set of hydraulic outriggers coupled to the second shipping container for raising the second shipping container a distance above a second delivery trailer and lowering the second shipping container to rest on a second support structure; and
 a third set of hydraulic outriggers coupled to the third shipping container for raising the third shipping container a distance above a third delivery trailer and lowering the third shipping container to rest on a third support structure.

7. The system of claim 6, wherein the first set of hydraulic outriggers are further adapted to stabilize the first shipping container in an upright position with the first shipping container supported by the first support structure, the second set of hydraulic outriggers are further adapted to stabilize the second shipping container in an upright position with the second shipping container supported by the second support structure, and the third set of hydraulic outriggers are further adapted to stabilize the third shipping container in an upright position with the third shipping container supported by the third support structure.

8. The system of claim 2, wherein the first shipping container includes a first suspended cable tray that is slidably deployable from a side of the first shipping container and is extendable toward the second shipping container, and wherein the second shipping container includes a second suspended cable tray that is slidably deployable from a side of the second shipping container and is extendable toward the first shipping container, wherein the first and second cable trays form a continuous support for an umbilical cable have a first end connected to the control unit and a second end connected to the light unit.

9. The system of claim 2, wherein the first plurality of photovoltaic panels are hingedly coupled to the first shipping container, the second plurality of photovoltaic panels are hingedly coupled to the second shipping container, and the third plurality of photovoltaic panels are hingedly coupled to the third shipping container, and
 wherein the first shipping container includes a first actuator for moving the first plurality of photovoltaic panels from a stowed position to a deployed position, the second shipping container includes a second actuator for moving the second plurality of photovoltaic panels from a stowed position to a deployed position, and the third shipping container includes a third actuator for moving the third plurality of photovoltaic panels from a stowed position to a deployed position.

10. The system of claim 2, wherein the first shipping container has a floor including a track mechanism for securing any one of a plurality of electrical generators having different physical connector patterns and/or dimensions.

11. The system of claim 1, further comprising:
a controller in digital communication with the first, second and third solar inverters and the first and second battery inverters.

12. The system of claim 11, wherein the controller is in digital communication with a first power meter that measures an amount of power input to the main distribution board from the combustion engine electrical generator and a second power meter that measure an amount of power output from the main distribution board to an external power consuming unit.

13. The system of claim 12, wherein the controller executes control logic to control the first, second and third solar inverters, the first and second battery inverters, and the combustion engine electrical generator to maximize use of power from the first, second and third pluralities of photovoltaic panels.

14. The system of claim 11, further comprising:
a network gateway converting digital communication in a first network using a first serial communication protocol and a second network using a second serial communication protocol, wherein the first network includes the first, second and third solar inverters and the first and second battery inverters, and wherein the second network includes the controller.

15. The system of claim 14, wherein the first serial communication protocol is a serial communication protocol standard and the second serial communication protocol is the Ethernet standard.

16. The system of claim 11, further comprising:
a modem in communication with the controller, wherein the modem enables the controller to communicate with a remote computer over a wide area network, and wherein the controller provides a software interface for enabling the remote computer to monitor power production and consumption within the system.

17. The system of claim 1, further comprising:
a first umbilical cable for connecting the solar unit to the control unit, wherein the first umbilical cable supports AC voltage transmission from the second solar inverter to the main distribution box, AC voltage transmission between the first battery inverter and the main distribution box, and communication signal transmission from a controller in the control unit to the second solar inverter and the first battery inverter in the solar unit.

18. The system of claim 17, wherein the first umbilical cable has a first end with a first quick connect coupling for connecting to a first mating coupling on the control unit and has a second end with a second quick connect coupling for connecting to a second mating coupling on the solar unit.

19. The system of claim 1, wherein the light unit is one of a plurality of light units, the system further comprising:
a plurality of umbilical cables, each umbilical cable for connecting a particular one of the plurality of light units to the control unit, wherein each umbilical cable supports AC voltage transmission from the third solar inverter of the particular light unit to the main distribution box, AC voltage transmission between the second battery inverter of one of the plurality of light units to the main distribution box, and communication signal transmission from a controller in the control unit to the third solar inverter and the second battery inverter in the particular light unit.

20. The system of claim 19, wherein the control unit includes a facility power output from the main distribution box for supplying electricity to an external power consuming unit.

21. The system of claim 1, further comprising:
an automatic transfer switch in communication with the combustion engine electrical generator for turning on the combustion engine electrical generator in response to sensing that an electrical demand on outputs from the main distribution exceeds the electrical supply available from the first, second and third pluralities of photovoltaic panels and the first and second rechargeable battery units.

22. A kit, comprising:
a control unit shipping container including:
a main distribution box having a plurality of alternating current connections;
a controller in digital communication with a bus network;
a combustion engine electrical generator having an alternating current output coupled to one of the alternating current connections of the main distribution box; and
a first plurality of photovoltaic panels having a first direct current output coupled to a first solar inverter that converts the first direct current output to an alternating current output that is coupled to one of the alternating current connections of the main distribution box, wherein the first solar inverter is connected to the bus network;
a first quick connect coupling having a pinout that includes a solar power conductor connected to the main distribution box, a battery power conductor connected to the main distribution box, a network wire connected to the bus network; and
a plurality of second quick connect couplings, each of the second quick connect couplings having a pinout that includes a battery power conductor connected to the main distribution box, and a network wire connected to the bus network; and
a solar unit shipping container including:
a second plurality of photovoltaic panels having a second direct current output coupled to a second solar inverter that converts the second direct current output to an alternating current output;
a first rechargeable battery unit coupled to a first battery inverter that converts alternating current to direct current for charging the first rechargeable battery unit and converts direct current discharged from the first rechargeable battery unit to alternating current; and
a quick connect coupling having a pinout that includes a solar power conductor connected to the second solar inverter, a battery power conductor connected to the first battery inverter, and a network wire connected to both the second solar inverter and the first battery inverter; and
a plurality of light unit shipping containers, each light unit shipping container including:
an array of area lights supported by a mast;
a third plurality of photovoltaic panels having a third direct current output coupled to a third solar inverter that converts the third direct current output to an alternating current output;
a second rechargeable battery unit coupled to a second battery inverter that converts alternating current to direct current for charging the second rechargeable battery unit and converts direct current discharged from the second rechargeable battery to alternating current; and a quick connect coupling having a pinout that includes a battery power conductor connected to the second battery inverter, and a network wire connected to both the third solar inverter and the second battery inverter;

a solar unit cable including a first end having a first quick connect coupling and second end having a second quick connect coupling, wherein the solar unit cable includes a solar power conductor, a battery power conductor and a network wire, and wherein the first quick connect coupling of the solar unit cable detachably couples with the quick connect coupling of the solar unit shipping container and the second quick connect coupling of the solar unit cable detachably couples with the quick connect coupling of the control unit shipping container; and a plurality of light unit cables, each light unit cable including a first end having a first quick connect coupling and a second end having a second quick connect coupling, wherein each light unit cable includes a battery power conductor and a network wire, and wherein the first quick connect coupling of each light unit cable detachably couples with one of the second quick connect couplings of the control unit shipping container.

* * * * *